US012764391B2

(12) United States Patent
Ahamed et al.

(10) Patent No.: US 12,764,391 B2
(45) **Date of Patent: *Oct. 13, 2026**

(54) GRAPHICALLY ANIMATED AUDIENCE

(71) Applicant: Adeia Guides Inc., San Jose, CA (US)

(72) Inventors: Shakir Sharfraz Ashfaq Ahamed, Amstelveen (NL); Sriram Ponnusamy, Chennai (IN); Susanto Sen, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/780,683

(22) Filed: Jul. 23, 2024

(65) Prior Publication Data

US 2024/0380952 A1 Nov. 14, 2024

Related U.S. Application Data

(63) Continuation of application No. 18/213,652, filed on Jun. 23, 2023, now Pat. No. 12,075,136, which is a continuation of application No. 17/867,820, filed on Jul. 19, 2022, now Pat. No. 11,736,780, which is a continuation of application No. 16/797,547, filed on Feb. 21, 2020, now Pat. No. 11,425,470.

(51) Int. Cl.

| | |
|---|---|
| ***H04N 21/81*** | (2011.01) |
| ***G06T 13/40*** | (2011.01) |
| ***H04N 21/442*** | (2011.01) |
| ***H04N 21/84*** | (2011.01) |

(52) U.S. Cl.
CPC ......... *H04N 21/8146* (2013.01); *G06T 13/40* (2013.01); *H04N 21/44218* (2013.01); *H04N 21/816* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 10,039,981 | B2 | 8/2018 | Dugan et al. | |
| 10,390,769 | B2 | 8/2019 | Kaleal et al. | |
| 11,736,780 | B2 | 8/2023 | Ahamed et al. | |
| 2013/0083961 | A1 | 4/2013 | Tateno | |
| 2017/0078743 | A1 | 3/2017 | Zheng | |
| 2017/0080346 | A1 | 3/2017 | Abbas | |
| 2017/0139802 | A1 | 5/2017 | Hajiyev et al. | |
| 2018/0027307 | A1 | 1/2018 | Ni et al. | |
| 2019/0005983 | A1 | 1/2019 | Gewickey et al. | |
| 2020/0258280 | A1 * | 8/2020 | Park | G06F 3/011 |
| 2021/0266648 | A1 | 8/2021 | Ahamed et al. | |
| 2023/0043846 | A1 | 2/2023 | Ahamed et al. | |
| 2023/0336838 | A1 | 10/2023 | Ahamed et al. | |

* cited by examiner

*Primary Examiner* — Tammy Goddard
(74) *Attorney, Agent, or Firm* — HG LAW LLP

(57) ABSTRACT

Systems and methods for generating a graphically animated audience are disclosed. Biometric data is captured via a sensor during display of content via a first device. The biometric data is stored in association with metadata for the content, and is mapped to a graphical representation. Based on the mapping of the biometric data to the graphical representation and the metadata, a graphical animation is generated for display in synchronization with displaying of the content via a second device.

20 Claims, 6 Drawing Sheets

600

| Genre (602) | Graphical Representation ID (604) |
|---|---|
| Animation | Animation Avatar ID |
| Drama | Drama Avatar ID |
| Comedy | Comedy Avatar ID |
| News | News Avatar ID |
| Educational | Educational Avatar ID |
| Sports | Sports Avatar ID |
| Documentary | Documentary Avatar ID |
| Western | Western Avatar ID |
| Horror | Horror Avatar ID |
| Romantic | Romantic Avatar ID |

FIG. 6

700

| User ID (702) | Content ID (704) | Metadata (706) | Biometric Data (708) |
|---|---|---|---|
| User_ID1 | Content_ID1 | Portion_ID1 | Biometric_Data1 |
| | | Portion_ID2 | Biometric_Data2 |
| | | Portion_ID3 | Biometric_Data3 |
| | | Portion_ID4 | Biometric_Data4 |
| | Content_ID2 | Portion_ID5 | Biometric_Data5 |
| | | Portion_ID6 | Biometric_Data6 |
| User_ID2 | Content_ID3 | Portion_ID7 | Biometric_Data7 |
| User_ID3 | Content_ID3 | Portion_ID7 | Biometric_Data8 |
| | Content_ID4 | Portion_ID8 | Biometric_Data9 |
| | | Portion_ID9 | Biometric_Data10 |
| | Content_ID5 | Portion_ID10 | Biometric_Data11 |
| | | Portion_ID11 | Biometric_Data12 |

FIG. 7

GRAPHICALLY ANIMATED AUDIENCE

CROSS-REFERENCE TO RELATED APPLICATIONS

This application is a continuation of U.S. patent application Ser. No. 18/213,652, filed Jun. 23, 2023, which is a continuation of U.S. patent application Ser. No. 17/867,820, filed Jul. 19, 2022, now U.S. Pat. No. 11,736,780, which is a continuation of U.S. patent application Ser. No. 16/797,547, filed Feb. 21, 2020, now U.S. Pat. No. 11,425,470, each of which is hereby incorporated by reference herein in its entirety.

BACKGROUND

The present disclosure relates to the display of visual content and, more particularly, to systems and related processes for generating a graphically animated audience.

SUMMARY

Although some viewers enjoy watching movies, shows, or other content alone, many viewers prefer to do so with friends or family. Watching content with others can enrich the user's viewing experience, for instance, by facilitating shared commentary and/or reactions to particular scenes or segments of the content. Scheduling conflicts and other factors, however, sometimes make it difficult for viewers to find a mutually convenient time to watch content together.

In view of the foregoing, the present disclosure provides systems and related methods that enable viewers to view content as if they were accompanied by a friend who has already viewed the content but is unavailable at the time the viewer wishes to watch the content. In one example, the present disclosure provides a system for generating a graphically animated audience. The system comprises a memory communication port and control circuitry. The memory is configured to store, in association with metadata for content, biometric data, such as facial expressions, gestures, emotional reactions, vocal sounds or commentary, and/or the like, captured via a sensor, such as a camera, a microphone, a heart rate sensor, and/or the like, during display of the content via a first device. The control circuitry is configured to map the biometric data to a graphical representation, such as an avatar, and generate a graphical animation, for display in synchronization with displaying of the content via a second device, based on the mapping of the biometric data to the graphical representation and the metadata. For instance, with reference to the example described above, biometric data may be captured from the friend as the friend was watching a movie or other content, and the system may utilize the biometric data and metadata, such as a time index, for the movie to select and/or configure an avatar that is animated to emulate the friend's physical reactions throughout the movie. For instance, the facial expressions, gestures, vocal sounds and/or the like may be audibly and/or visibly presented via the graphical animation on the second device. In this manner, when the viewer later begins to watch the movie without the friend, the system may generate for audible and/or visible presentation to the viewer, for example, as an overlay on the television screen, the animated avatar, so it is as if the viewer is watching the movie with the friend.

In another example, the control circuitry may be further configured to determine an attribute of the content, such as a genre, a setting, a time period, or a theme, based on content metadata, and select, based on the attribute of the content, the graphical representation from among a plurality of graphical representations. For instance, the system may select a humorous avatar for display during playback of a comedic movie or scene and a sporty avatar for display during playback of sports-related content.

The control circuitry, in some aspects, may be further configured to store, in a database, identifiers of the plurality of graphical representations, identifiers of the plurality of content attributes, and associations between the identifiers of the graphical representations and the identifiers of the content attributes. In such aspects, the control circuitry may access the database to identify from among the plurality of graphical representations the graphical representation associated with the attribute of the content, with the graphical representation identified in the database being selected from among the plurality of graphical representations.

In some examples, portions of the content have respective attributes, and the control circuitry is further configured to determine the respective attributes of the portions of content based on content metadata and select respective graphical representations for the portions of content based on the attributes of the portions of content, with the respective graphical representations selected for the portions of content being generated for display in synchronization with displaying of the portions of content via the second device. Portions of the content may be concurrently displayed via the first device and the second device, for instance, so multiple viewers may view the content and/or avatars simultaneously via their respective devices.

The metadata, in some aspects, may comprise temporal data that identifies a portion of the content. In such aspects, the control circuitry may be further configured to store the biometric data in association with the metadata for the content by storing, in association with the temporal data identifying the portion of the content, the biometric data that was captured when the portion of the content was playing via the first device. In this manner, for example, the friend's audible and/or visible reactions, as mapped onto the avatar, may be synchronized for playback with the portion of the content that triggered such reactions.

BRIEF DESCRIPTION OF THE DRAWINGS

The above and other objects and advantages of the disclosure will be apparent upon consideration of the following detailed description, taken in conjunction with the accompanying drawings, in which:

FIG. 6 depicts an example data structure of a database that associates graphical representation identifiers with content attribute identifiers, in accordance with some embodiments of the disclosure; and FIG. 7 depicts an example data structure of a database that associates biometric data with content metadata, in accordance with some embodiments of the disclosure.

DETAILED DESCRIPTION

Figure 1:
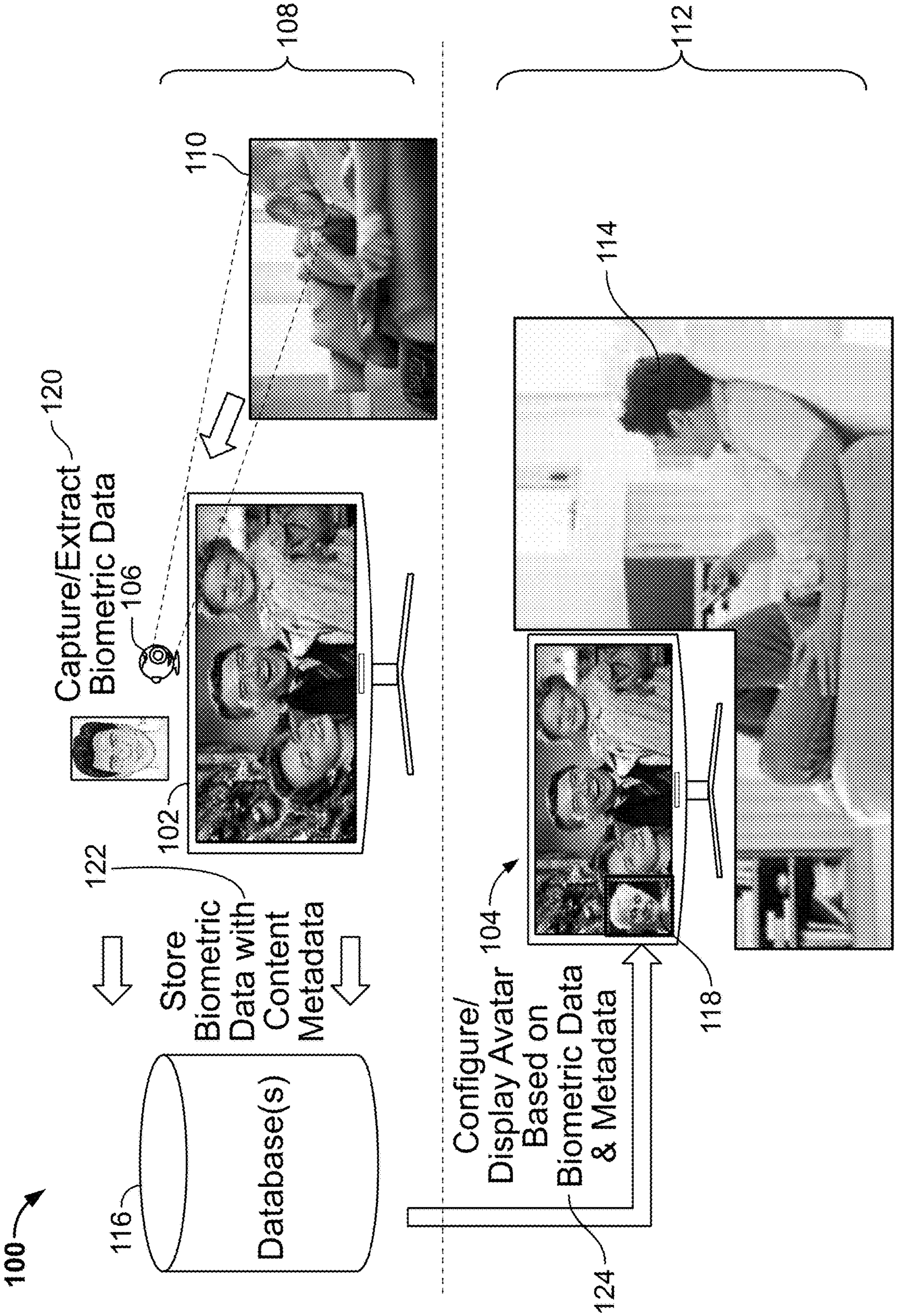
FIG. 1 illustrates an overview of a scenario in which a system generates a graphically animated audience, in accordance with some embodiments of the disclosure.

FIG. 1 illustrates an overview of a scenario in which system 100 generates a graphically animated audience, in accordance with some embodiments of the disclosure. System 100 includes computing devices 102 and 104, either or both of which may be a smart phone, a smart television, a personal computer, a laptop computer, a tablet computer, or any other type of computing device that has displays and/or audio drivers, such as speakers (not separately shown in FIG. 1), that are respectively configured to visibly and/or audibly present content to one or more nearby users. In some embodiments, devices 102 and 104 also include various user interfaces configured to interact with the one or more nearby users.

Additionally, one or more sensors 106, such as a camera, a microphone, a heart rate sensor, and/or the like, are communicatively coupled to device 102. FIG. 1 shows two environments, environment 108, in which a first user 110 views content via device 102, and environment 112, in which a second user 114 views content via device 104. In various embodiments, user 110 may view content via device 102 in environment 108 at the same time as user 114 views content via device 104 in environment 112 or at a different time than user 114 views content via device 104 in environment 112. In various embodiments, devices 102 and 104 are communicatively coupled to database 116 and/or one or more servers (not separately shown in FIG. 1) by way of a network (not separately shown in FIG. 1) or one or more other communication paths.

Sensor 106 captures (120) biometric data of user 110, such as data representing facial expressions, gestures, emotional reactions, vocal sounds or commentary, and/or the like of user 110, during audible and/or visible presentation of a particular content item, such as a particular movie, via device 102. The captured biometric data is stored (122) in database 116 in association with metadata for the content item, such as temporal data identifying a portion of the content that was being presented via device 102 at the time the biometric data was captured. The stored biometric data also is mapped to a graphical representation, such as an avatar, which may be stored in database 116 or another database and selected and/or configured based on various criteria as described in further detail below. Based on the mapping of the biometric data to the graphical representation and the metadata, a graphical animation 118 is generated (124) for audible and/or visible presentation to user 114 via device 104, for instance as an overlay, in synchronization with presentation of the content item via device 104. In this manner, system 100 may enable user 114 to view the content item via device 104 as if they were accompanied by user 110, who has already viewed the content item but is unavailable at the time user 114 wishes to view the content.

Figure 2:
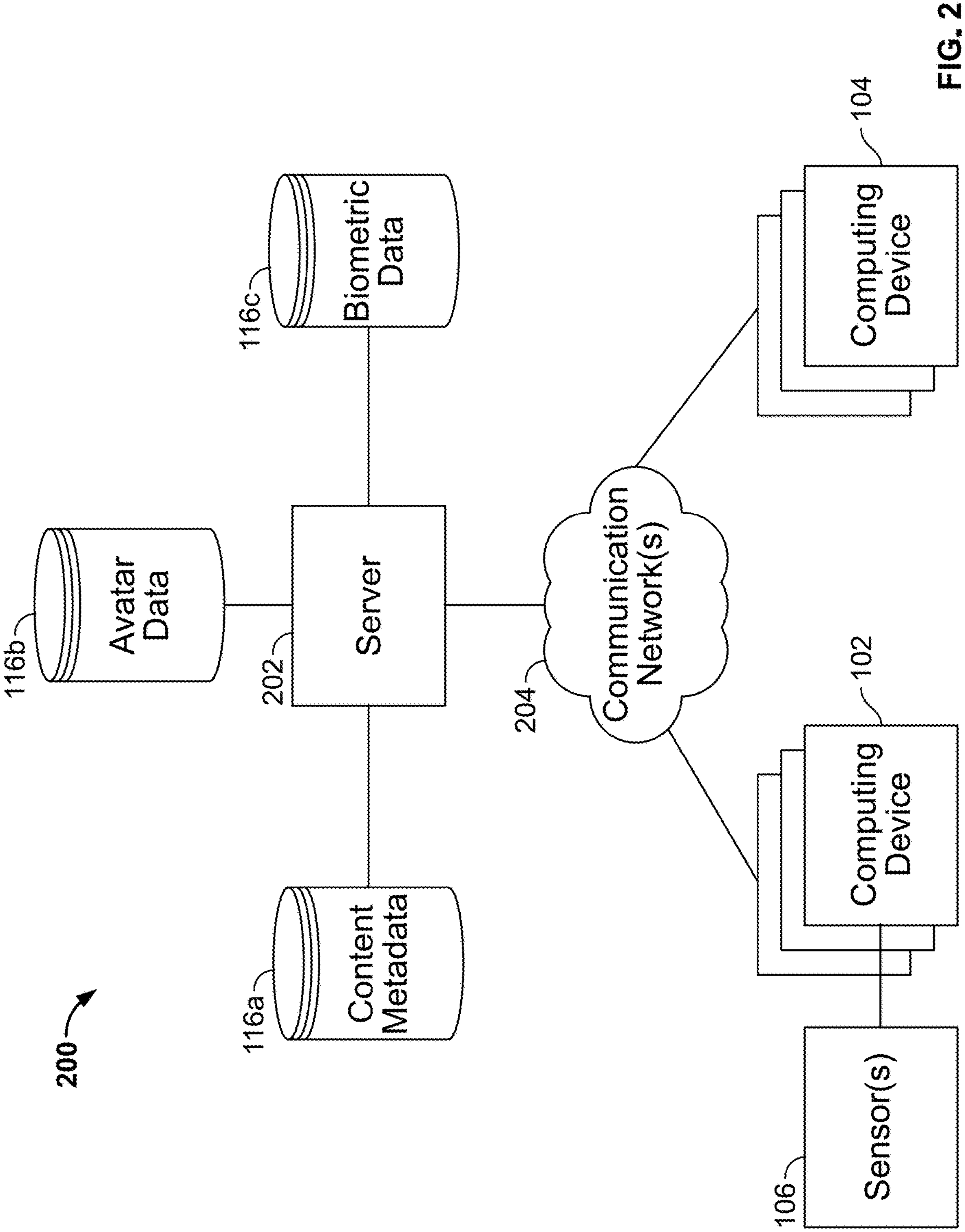
FIG. 2 is an illustrative block diagram showing a system for generating a graphically animated audience, in accordance with some embodiments of the disclosure.

FIG. 2 is an illustrative block diagram showing system 200 for generating a graphically animated audience, in accordance with some embodiments of the disclosure. System 200 may, in some embodiments, further represent system 100. Although FIG. 2 shows system 200 as including a number and configuration of individual components, in some embodiments, any number of the components of system 200 may be combined and/or integrated as one device. System 200 includes server 202, communication network 204, computing devices 102 and 104, and databases 116*a*, 116*b*, and 116*c* (collectively database 116), which in this example store content metadata, avatar data, and biometric data, respectively. Server 202 is communicatively coupled to computing device 102 and/or computing device 104 by way of communication network 204, which may include the Internet and/or any other suitable wired and/or wireless communication paths, networks and/or groups of networks. In some aspects, server 202 may be communicatively coupled to one or more computing devices 102 and computing devices 104 at different times. For instance, server 202 may be communicatively coupled to computing device 102 during a biometric data capturing operation, and then may cease to be communicatively coupled to computing device 102 while server 202 is communicatively coupled to computing device 104 during an avatar playback operation based on the prior biometric data capturing operation.

Figure 3:
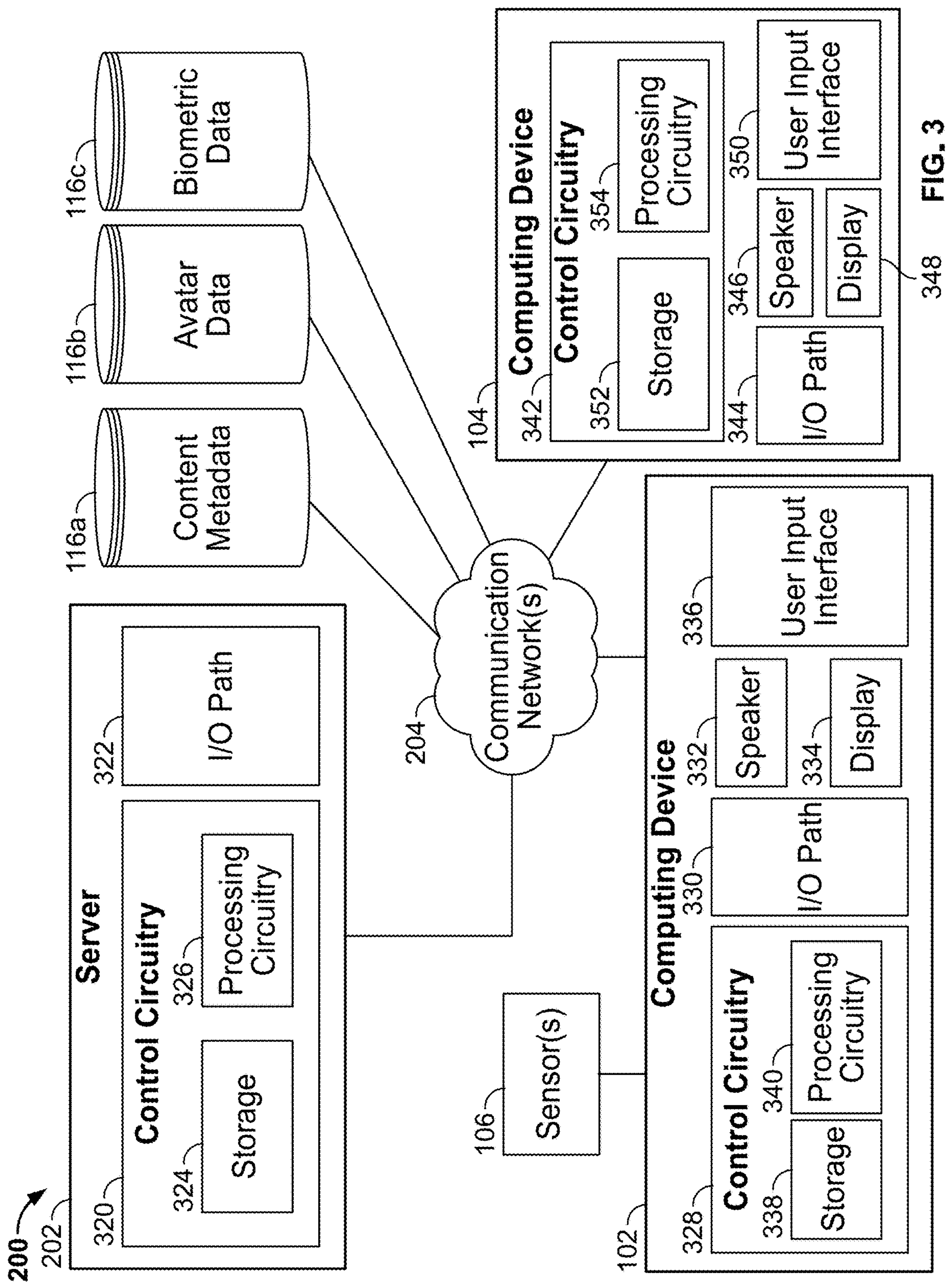
FIG. 3 is an illustrative block diagram showing additional details of a system for generating a graphically animated audience, in accordance with some embodiments of the disclosure.

FIG. 3 is an illustrative block diagram showing additional details of an example of system 200 for generating a graphically animated audience, in accordance with some embodiments of the disclosure. Although FIG. 3 shows system 200 as including a number and configuration of individual components, in some embodiments, any number of the components of system 100 may be combined and/or integrated as one device. Because FIG. 3 shows many of the same components described above in connection with FIG. 1 and/or FIG. 2, those components are not reintroduced here. In some embodiments, system 200 excludes server 202, and functionality that would otherwise be implemented by server 202 is instead implemented by other components of system 200, such as computing devices 102 and/or 104. In still other embodiments, server 202 works in conjunction with computing devices 102 and/or 104 to implement certain functionality described herein in a distributed or cooperative manner.

Server 202 includes control circuitry 320 and input/output (hereinafter "I/O") path 322, and control circuitry 320 includes storage 324 and processing circuitry 326. Computing device 102 includes control circuitry 328, I/O path 330, speaker 332, display 334, and user input interface 336. Control circuitry 328 includes storage 338 and processing circuitry 340. Computing device 104 includes control circuitry 342, I/O path 344, speaker 346, display 348, and user input interface 350. Control circuitry 342 includes storage 352 and processing circuitry 354. Control circuitry 320, 328, and/or 342 may be based on any suitable processing circuitry such as processing circuitry 326, 340, and/or 354. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 324, storage 338, storage 352, and/or storages of other components of system 200 (e.g., storages of databases 116*a*, 116*b*, 116*c*, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 324, storage 338, storage 352, and/or storages of other components of system 200 may be used to store various types of content, metadata, and or other types of data. Non-volatile memory may also be used (e.g., to launch a boot-up routine and other instructions). Cloud-based storage may be used to supplement storages 324, 338, 352 or instead of storages 324, 338, 352. In some embodiments, control circuitry 320, 328, and/or 342 executes instructions for an application stored in memory (e.g., storage 324, 338, and/or 352). Specifically, control circuitry 320, 328, and/or 342 may be instructed by the application to perform the functions discussed herein. In some implementations, any action performed by control circuitry 320, 328, and/or 342 may be based on instructions received from the application. For example, the application may be implemented as software or a set of executable instructions that may be stored in storage 324, 338, and/or 352 and executed by control circuitry 320, 328, and/or 342. In some embodiments, the application may be a client/server application where only a client application resides on computing device 102 and/or 104, and a server application resides on server 202.

The application may be implemented using any suitable architecture. For example, it may be a stand-alone application wholly implemented on computing device 102 and/or 104. In such an approach, instructions for the application are stored locally (e.g., in storage 338 or 352), and data for use by the application is downloaded on a periodic basis (e.g., from an out-of-band feed, from an Internet resource, or using another suitable approach). Control circuitry 328 or 342 may retrieve instructions for the application from storage 338 or 352 and process the instructions to perform the functionality described herein. Based on the processed instructions, control circuitry 328 or 342 may determine what action to perform when input is received from user input interface 336 or 350.

In client/server-based embodiments, control circuitry 328 and/or 342 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 204). In another example of a client/server-based application, control circuitry 328 and/or 342 runs a web browser that interprets web pages provided by a remote server (e.g., server 202). For example, the remote server may store the instructions for the application in a storage device. The remote server may process the stored instructions using circuitry (e.g., control circuitry 320) and/or generate displays. Computing device 102 and/or 104 may receive the displays generated by the remote server and may display the content of the displays locally via display 334 and/or 348. This way, the processing of the instructions is performed remotely (e.g., by server 202) while the resulting displays, such as the display windows described elsewhere herein, are provided locally on computing device 102 and/or 104. Computing device 102 and/or 104 may receive inputs from the user via input interface 336 and/or 350 and transmit those inputs to the remote server for processing and generating the corresponding displays.

A user may send instructions to control circuitry 320, 328, and/or 342 using user input interface 336 and/or 350. User input interface 336 and/or 350 may be any suitable user interface, such as a remote control, trackball, keypad, keyboard, touchscreen, touchpad, stylus, joystick, voice recognition interface, gaming controller, or other user input interfaces. User input interface 336 and/or 350 may be integrated with or combined with display 334 and/or 348, respectively, which may be a monitor, a television, a liquid crystal display (LCD), an electronic ink display, or any other equipment suitable for displaying visual images.

Server 202 and computing devices 102 and/or 104 may transmit and receive content and data via one or more of I/O paths 322, 330, and 344. For instance, I/O path 322, I/O path 330, and/or I/O path 344 may include a communication port configured to transmit and/or receive (for instance to and/or from databases 116*a*, 116*b*, and/or 116*c*), via communication network 204, content item identifiers, natural language queries, and/or other data. Control circuitry 320, 328, 342 may be used to send and receive commands, requests, and other suitable data using I/O paths 322, 330, 344.

Figure 4:
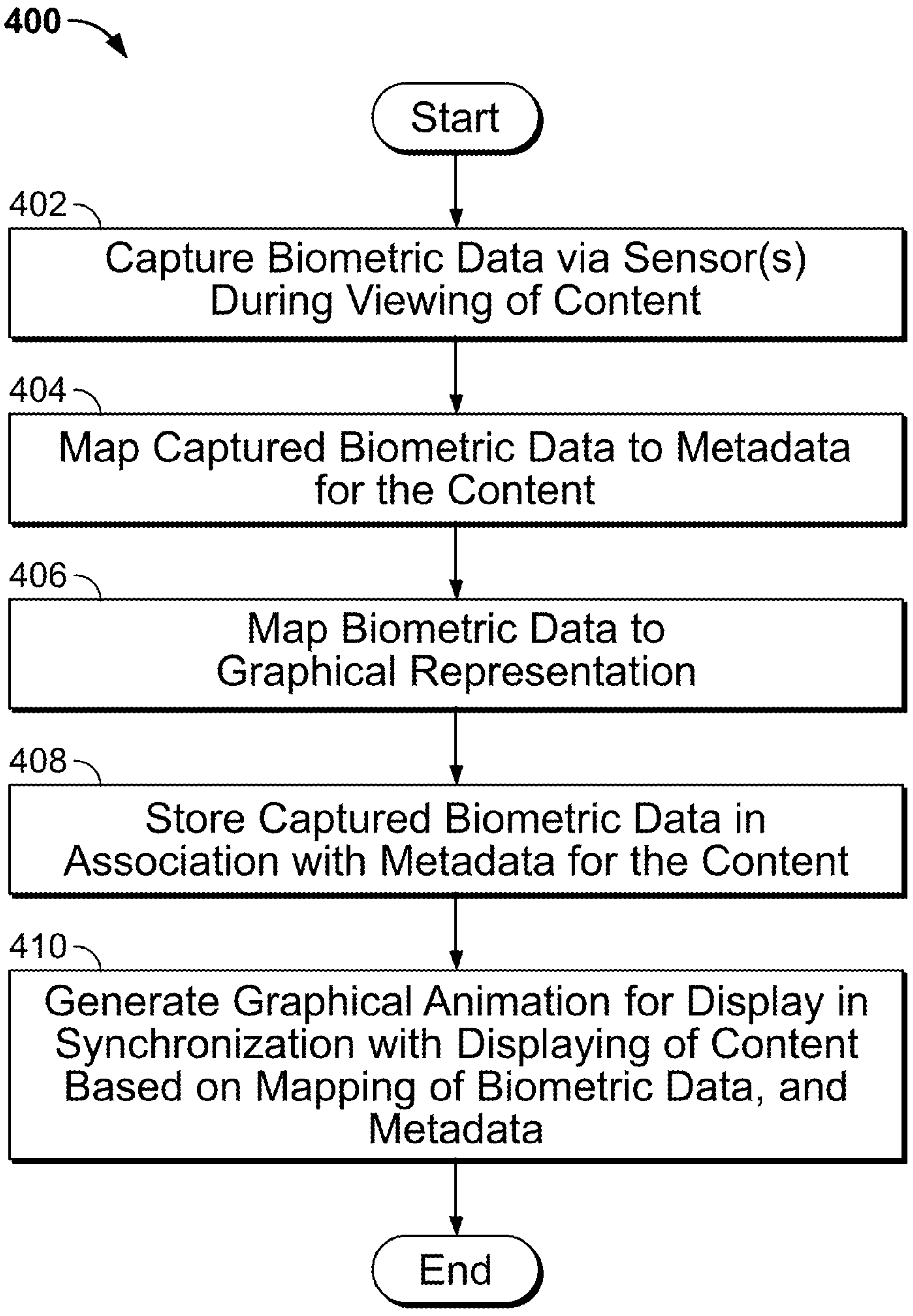
FIG. 4 depicts an illustrative flowchart of a process for generating a graphically animated audience, in accordance with some embodiments of the disclosure.

Having described system 100 and 200, reference is now made to FIG. 4, which depicts an illustrative flowchart of process 400 for generating a graphically animated audience, which may be implemented by system 100 and/or 200, in accordance with some embodiments of the disclosure. In various embodiments, individual steps of process 400, or any process described herein, may be implemented by one or more components of system 100, 200. Although the present disclosure may describe certain steps of process 400 (and of other processes described herein) as being implemented by certain components of system 100, 200, this is for purposes of illustration only, and other components of system 100, 200 may implement those steps instead. At 402, control circuitry 320 receives biometric data captured based on viewer 110 via sensor(s) 106 while viewer 110 is viewing an item of content via display 334. Example types of biometric data that may be captured at 402 include a facial expression, a gesture, a vocal sound, and/or the like.

At 404, control circuitry 320 maps the biometric data captured at 402 to metadata for the content. For instance, control circuitry 320 may store and synchronize audio and/or video, and/or fiducial points captured of viewer 110 with portions of the content being played during the capture of such audio, video, and/or fiducial points.

At 406, control circuitry 320 maps the biometric data captured at 402 to a graphical representation, such as an avatar. For example, control circuitry 320 may map fiducial points of images originating from viewer 110 onto corresponding points of an avatar to animate the avatar to mimic the facial expressions of viewer 110 while content is playing via device 102. Control circuitry 320 may also store and map sounds, such as the laughs, commentary, or other sounds made by viewer 110 during playing of the content to the temporal metadata of the content for future playback to viewer 114 while the content is played via device 104.

At 408, control circuitry 320 stores the captured biometric data in association with metadata for the content. For example, control circuitry 320 may store the captured biometric data in association with metadata including temporal data identifying a portion of the content that was playing via device 102 while the biometric data was captured at 402.

At 410, control circuitry 320 generates a graphical animation, such as 118 of FIG. 1, for display in synchronization with displaying of content based on mapping of biometric data and metadata. For instance, control circuitry 320 may animate the graphical animation to mimic the facial expressions, gestures, and/or vocal sounds for audible and/or visible presentation via device 104. In various aspects, viewers 110 and 114 may view the content or portions thereof concurrently or at different times. For instance, portions of the content may be concurrently displayed via device 102 and device 104 or displayed at different times via device 102 and device 104.

Figure 5:
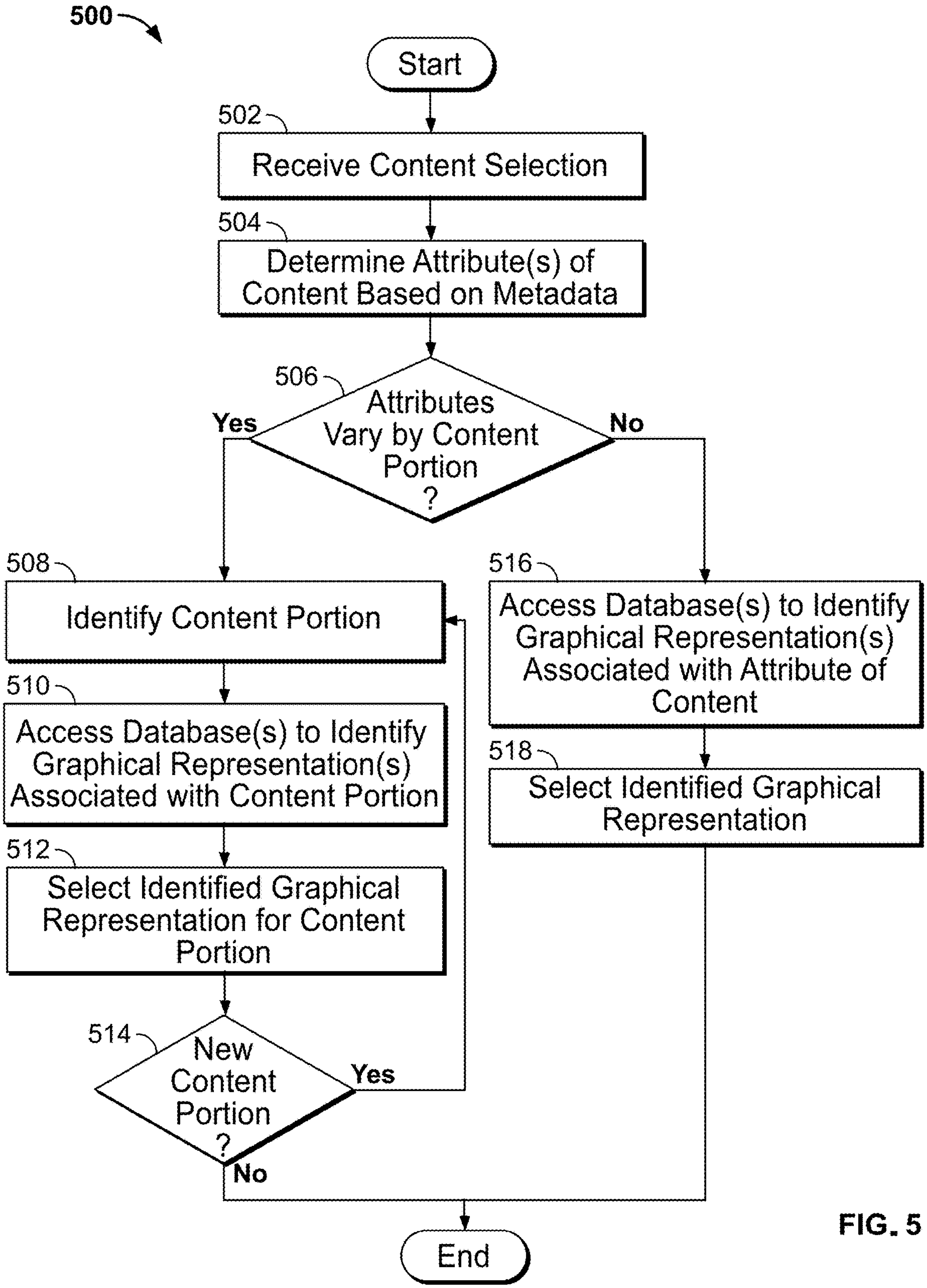
FIG. 5 depicts an illustrative flowchart of a process for selecting a graphical representation based on a content attribute, in accordance with some embodiments of the disclosure.

FIG. 5 depicts an illustrative flowchart of process 500 for selecting a graphical representation based on a content attribute, in accordance with some embodiments of the disclosure. At 502, control circuitry 320 receives a selection of content for playback, such as a selection of the content item for which biometric data was captured at 402.

At 504, control circuitry 320 determines an attribute of content based on metadata. Example types of attributes of content include a genre, a setting, a time period, or a theme for the content.

In some aspects, portions of the content have respective attributes. In such aspects, control circuitry 320 may determine the respective attributes of the portions of content based on content metadata, select respective graphical representations for the portions of content based on the attributes of the portions of content. The respective graphical representations selected for the portions of content may then be generated for display in synchronization with audible and/or visible presentation of the portions of content via device 104. At 506, control circuitry 320 determines whether the attributes for the content item selected at 502 vary by content portion. If the attributes for the selected content item vary by content portion ("Yes" at 506) then control passes to 508. If, on the other hand, the attributes for the selected content item do not vary by content portion ("No" at 506) then control passes to 516.

At 508, control circuitry 320 identifies a portion of the content item to be played back. For instance, control circuitry 320 may identify a portion of the content currently being played via device 104 and/or a portion of content selected to be played back at 502.

At 510, control circuitry 320 accesses database 116 to identify graphical representations associated with the content portion identified at 508. At 512, control circuitry 320 selects the graphical representation identified at 510 for the content portion. FIG. 6 depicts an example data structure 600 of database 116 that associates graphical representation identifiers 604 with content attribute identifiers 602, in accordance with some embodiments of the disclosure. In various embodiments, data structure 600 may be employed in connection with process 500 at 510 and/or 516 to select a graphical representation based on a content attribute. In some aspects, control circuitry 320 stores in database 116 graphical representation identifiers 604, content attribute identifiers 602, and associations between the identifiers of the graphical representations and the identifiers of the content attributes. In such aspects, control circuitry 320 may access database 116 to identify from among the graphical representation identifiers the graphical representation identifier that is associated with the attribute of the content that was determined at 504. Control circuitry 320 then may select at 512 or 518 the identified graphical representation or identifier from among the graphical representation identifiers stored in database 116. In some examples, for instance, control circuitry 320 may select and/or configure an avatar, such as avatar 118, that is based on a character featured in the content item being played via device 102 and/or device 104. In still other aspects, funny, witty, intelligent, sarcastic, angry, or other types of avatars may be selected based on a genre, for instance, based on user preference, content metadata, or the like.

At 514, control circuitry 320 determines whether there is an additional content portion of the item of content. If there is an additional content portion of the item of content ("Yes" at 514), then control passes back to 508 to repeat the functionality described above for the additional content portion. If, on the other hand, there is no additional content portion of the item of content ("No" at 514), then process 500 terminates.

At 516, control circuitry 320 accesses database(s) 116 to identify one or more graphical representation(s) associated with the attribute of content determined at 504. At 518, control circuitry 320 selects the graphical representation identified at 516.

FIG. 7 depicts an example data structure 700 of a database that associates biometric data with content metadata, in accordance with some embodiments of the disclosure. In various embodiments, data structure 700 may be employed to store data and/or metadata for use in generating a graphically animated audience in connection with process 400 described above. Data structure 700 includes user identifiers 702, content identifiers 704, metadata identifiers 706, and biometric data 708. Data structure 700 associates each user identifier 702 with content identifiers 704 for items of content the user has viewed, and with corresponding metadata identifiers 706, which may identify portions of the content, and biometric data 708 of viewer 110 captured during playing of the identified portions of content.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a graphically animated audience, the method comprising:

capturing biometric data via a sensor during display of content via a device during a first viewing session;

storing the biometric data in association with content attributes of the content;

mapping the biometric data to one or more avatars;

generating an avatar animation of the one or more avatars based on the mapping of the biometric data to the one or more avatars and the content attributes of the content;

providing, during a second viewing session after the first viewing session, the avatar animation for display in synchronization with display of the content according to the stored biometric data associated with the content attributes of the content.

2. The method of claim 1, wherein the content comprises a plurality of content portions and wherein each content portion is associated with at least one content attribute.

3. The method of claim 2, wherein the storing the biometric data in association with the content attributes of the content further comprises:

determining that a first subset of the biometric data corresponds to a first content portion, wherein the first content portion corresponds to a first content attribute;

determining that a second subset of the biometric data corresponds to a second content portion, wherein the second content portion corresponds to a second content attribute;

storing the first subset of the biometric data in association with the first content attribute; and storing the second subset of biometric data in association with the second content attribute.

4. The method of claim 3, wherein the generating the avatar animation of the one or more avatars based on the mapping of the biometric data to the one or more avatars and the content attributes of the content further comprises:

generating an avatar animation of a first avatar for the first subset of biometric data corresponding to the first content portion, wherein the first avatar is based on the first content attribute; and generating an avatar animation of a second avatar for the second subset of biometric data corresponding to the second content portion, wherein the second avatar is based on the second content attribute.

5. The method of claim 1, wherein the content attributes correspond to at least one of a: genre, a setting, a time period, a theme for the content, or a character depicted in the content.

6. The method of claim 1, wherein the biometric data comprises at least one of a facial expression, a gesture, or a vocal sound, and wherein at least one of the facial expression, the gesture, or the vocal sound is audibly or visibly presented via the avatar animation.

7. The method of claim 1, wherein the sensor comprises at least one of a camera, a microphone, or a heart rate sensor.

8. The method of claim 1, further comprising:

determining the content attributes of the content based on content metadata; and selecting the one or more avatars from a plurality of avatars based on the content attributes.

9. The method of claim 1, wherein the device is a first device corresponding to a first user, wherein the avatar animation is displayed in synchronization with the display of the content via a second device corresponding to a second user.

10. The method of claim 1, wherein the avatar animation is synchronized with the display of the content during the second viewing session based on temporal data of content metadata.

11. A system for generating a graphically animated audience, the system comprising:

a memory configured to store, biometric data captured via a sensor during display of content via a device during a first viewing session; and control circuitry configured to:

capture biometric data via the sensor during display of content via the device during the first viewing session;

store the biometric data in association with content attributes of the content;

map the biometric data to one or more avatars;

generate an avatar animation of the one or more avatars based on the mapping of the biometric data to the one or more avatars and the content attributes of the content;

provide, during a second viewing session after the first viewing session, the avatar animation for display in synchronization with display of the content according to the stored biometric data associated with the content attributes of the content.

12. The system of claim 11, wherein the content comprises a plurality of content portions and wherein each content portion is associated with at least one content attribute.

13. The system of claim 12, wherein the control circuitry configured to store the biometric data in association with the content attributes of the content is further configured to:

determine that a first subset of the biometric data corresponds to a first content portion, wherein the first content portion corresponds to a first content attribute;

determine that a second subset of the biometric data corresponds to a second content portion, wherein the second content portion corresponds to a second content attribute;

store the first subset of the biometric data in association with the first content attribute; and store the second subset of biometric data in association with the second content attribute.

14. The system of claim 13, wherein the control circuitry configured to generate the avatar animation of the one or more avatars based on the mapping of the biometric data to the one or more avatars and the content attributes of the content is further configured to:

generate an avatar animation of a first avatar for the first subset of biometric data corresponding to the first content portion, wherein the first avatar is based on the first content attribute; and generate an avatar animation of a second avatar for the second subset of biometric data corresponding to the second content portion, wherein the second avatar is based on the second content attribute.

15. The system of claim 11, wherein the content attributes correspond to at least one of a: genre, a setting, a time period, a theme for the content, or a character depicted in the content.

16. The system of claim 11, wherein the biometric data comprises at least one of a facial expression, a gesture, or a vocal sound, and wherein at least one of the facial expression, the gesture, or the vocal sound is audibly or visibly presented via the avatar animation.

17. The system of claim 11, wherein the sensor comprises at least one of a camera, a microphone, or a heart rate sensor.

18. The system of claim 11, wherein the control circuitry is further configured to:

determine the content attributes of the content based on content metadata; and select the one or more avatars from a plurality of avatars based on the content attributes.

19. The system of claim 11, wherein the device is a first device corresponding to a first user, and wherein the avatar animation is displayed in synchronization with the display of the content via a second device corresponding to a second user.

20. The system of claim 11, wherein the control circuitry is configured to synchronize the avatar animation with the display of the content during the second viewing session based on temporal data of content metadata.

* * * * *